(12) United States Patent
Henderson et al.

(10) Patent No.: US 9,056,636 B2
(45) Date of Patent: Jun. 16, 2015

(54) DEVICES AND METHODS FOR REDUCING VEHICLE DRAG

(71) Applicants: Michael Lorenzo Henderson, Piedmont, SC (US); Stephen Alfred Wulff, Simpsonville, SC (US)

(72) Inventors: Michael Lorenzo Henderson, Piedmont, SC (US); Stephen Alfred Wulff, Simpsonville, SC (US)

(73) Assignee: SmartTruck Systems, LLC, Greenville, SC (US)

( * ) Notice: Subject to any disclaimer, the term of this patent is extended or adjusted under 35 U.S.C. 154(b) by 0 days.

(21) Appl. No.: 14/230,524

(22) Filed: Mar. 31, 2014

(65) Prior Publication Data

US 2014/0239669 A1   Aug. 28, 2014

Related U.S. Application Data

(63) Continuation of application No. 12/905,674, filed on Oct. 15, 2010, now Pat. No. 8,684,447, which is a continuation-in-part of application No. 12/791,302, filed on Jun. 1, 2010, now Pat. No. 8,251,436, which is a continuation-in-part of application No. 12/775,095, filed on May 6, 2010, now Pat. No. 8,342,595.

(51) Int. Cl.
*B62D 35/00* (2006.01)

(52) U.S. Cl.
CPC .................... *B62D 35/001* (2013.01)

(58) Field of Classification Search
USPC .......... 296/181.5, 180.1, 180.3, 180.4, 180.5, 296/65.13
See application file for complete search history.

(56) References Cited

U.S. PATENT DOCUMENTS

| | | | |
|---|---|---|---|
| 3,960,402 A | 6/1976 | Keck | |
| 4,386,801 A | 6/1983 | Chapman et al. | |
| 4,421,354 A | 12/1983 | Lemaster | |
| 4,457,550 A | 7/1984 | Gielow et al. | |
| 4,640,541 A | 2/1987 | FitzGerald et al. | |
| 5,280,990 A | 1/1994 | Rinard | |
| 5,498,059 A | 3/1996 | Switlik | |
| 6,257,654 B1 | 7/2001 | Boivin et al. | |
| 6,485,087 B1 | 11/2002 | Roberge et al. | |
| 6,974,178 B2 | 12/2005 | Ortega et al. | |
| 7,192,077 B1 | 3/2007 | Hilleman | |
| 7,240,958 B2 | 7/2007 | Skopic | |
| 7,484,791 B1 | 2/2009 | Chen | |
| 7,625,034 B1 | 12/2009 | Fitzgerald | |
| 7,641,262 B2 | 1/2010 | Nusbaum | |
| 7,780,224 B2 | 8/2010 | Roush | |
| 7,789,453 B2 | 9/2010 | Roush et al. | |
| 7,794,011 B2 | 9/2010 | Kjellgren et al. | |
| 7,806,464 B2 | 10/2010 | Cardolle | |

(Continued)

FOREIGN PATENT DOCUMENTS

| | | |
|---|---|---|
| CA | 1156293 A | 11/1983 |
| DE | 19960483 A1 | 6/2001 |

(Continued)

OTHER PUBLICATIONS

International Search Report from PCT/US2011/038682—3 pages.

(Continued)

*Primary Examiner* — Jason S Morrow
(74) *Attorney, Agent, or Firm* — Dority & Manning, P.A.

(57) ABSTRACT

In certain embodiments of the present invention, a vehicle trailer is described that includes a shelf component that extends from the rear wall of the trailer and that defines a sloped surface.

23 Claims, 10 Drawing Sheets

(56) References Cited

U.S. PATENT DOCUMENTS

| | | |
|---|---|---|
| 7,862,102 B1 | 1/2011 | Benton |
| 7,950,720 B2 | 5/2011 | Skopic |
| 7,992,923 B2 | 8/2011 | Dayton |
| 8,100,461 B2 | 1/2012 | Smith |
| 8,251,436 B2 | 8/2012 | Henderson et al. |
| 8,491,036 B2 | 7/2013 | Henderson et al. |
| 2005/0146161 A1 | 7/2005 | Uland |
| 2006/0252361 A1 | 11/2006 | Henderson, II |
| 2007/0120397 A1 | 5/2007 | Layfield et al. |
| 2008/0048468 A1 | 2/2008 | Holubar |
| 2008/0093886 A1 | 4/2008 | Nusbaum |
| 2009/0045649 A1 | 2/2009 | Eungard et al. |
| 2009/0146453 A1 | 6/2009 | Ortega et al. |
| 2009/0179456 A1 | 7/2009 | Holubar |
| 2009/0236872 A1 | 9/2009 | Wood |
| 2010/0066123 A1 | 3/2010 | Ortega et al. |
| 2010/0164249 A1 | 7/2010 | Nusbaum |
| 2011/0068605 A1 | 3/2011 | Domo et al. |
| 2011/0095565 A1 | 4/2011 | Chen |
| 2011/0095566 A1 | 4/2011 | Chen |
| 2011/0272963 A1 | 11/2011 | Henderon et al. |
| 2011/0272965 A1 | 11/2011 | Henderson et al. |

FOREIGN PATENT DOCUMENTS

| | | |
|---|---|---|
| GB | 2051691 A | 1/1981 |
| GB | 2228456 A | 8/1990 |
| JP | 7052793 | 12/1995 |
| KR | 20-0182899 | 6/2000 |
| WO | WO 2006/080873 | 8/2006 |
| WO | WO 2008/125863 | 10/2008 |

OTHER PUBLICATIONS

International Search Report and Written Opinion from PCT/US2011/035124—10 pages.
International Search Report and Written Opinion from PCT/US2011/055673—9 pages.
NRC Wind Tunnel Test SAE Paper.
TMA (Truck Manufacturers Association), Test, Evaluation and Demonstration of Practical Devices/Systems to Reduce Aerodynamic Drag of Tractor/Semitrailer Combination Unit Trucks, Prepared for the National Energy Technology Laboratory (NTEL) under contract No. DE-FC26-04NT42117, Apr. 2007, Morgantown, WV, pp. 64-77.

DEVICES AND METHODS FOR REDUCING VEHICLE DRAG

RELATED APPLICATIONS

The present application is a continuation of U.S. patent application Ser. No. 12/905,674 filed on Oct. 15, 2010, now U.S. Pat. No. 8,684,447, which is a continuation-in-part of U.S. patent application Ser. No. 12/791,302 filed on Jun. 1, 2010, now U.S. Pat. No. 8,251,436, which, itself, is a continuation-in-part of U.S. patent application Ser. No. 12/775,095 filed on May 6, 2010, now U.S. Pat. No. 8,342,595, all of which are hereby incorporated by reference herein in their entirety for all purposes.

BACKGROUND

An ongoing effort to reduce drag in vehicular structures is of great importance as fuel economy becomes an increasingly large consideration in vehicular design. As the drag of a vehicle increases, the amount of fuel needed to move the vehicle also increases due to the greater energy required to overcome the drag. For instance, it has been stated that for a vehicle traveling at 70 mph, about 65% of the total fuel consumption of the vehicle's engine is used to overcome drag. Therefore, even a small reduction in the drag experienced by a vehicle traveling at highway speeds can result in a significant improvement in fuel economy.

For instance, heavy-duty vehicles such as tractor-trailers (also known as semi tractors, tractors, class 8 long haul trucks, transfer trucks, 18-wheelers, semis, etc.) have a tall and wide box-shaped profile that creates a significant amount of drag compared to smaller vehicles on the road. For instance, Table I lists common drag coefficients of road vehicles.

TABLE I

| Type of Vehicle | Drag Coefficient (Cd) |
| --- | --- |
| Low Drag Production Car | .26 |
| Typical Sedan | .3-.35 |
| Sport Utility Vehicle | .4-.5 |
| Pick-up Truck | .4-.5 |
| Conventional Class 8 long haul tractor trailers | .59-.63 |

In the U.S., vehicles commonly used to move freight typically include a tractor which powers the vehicle and a trailer which contains the freight. Tractors usually have 3 axles, the front, or "steer", axle having two wheels, and two rear, or "drive", axles each having a pair of wheels on each side. The most common configuration of this type of tractor has 10 wheels; however, in some cases the traditional pairs of wheels and tires are replaced by single wides; also known as "super singles", or wide-base singles. Single wide tires and wheels reduce the weight of the semi-trailer and in some cases reduce the rolling resistance of the vehicle. Tractors equipped with single wides only have six tires and wheels. Smaller tractors, having a single drive axle (for 6 wheels in total) are often used to pull shorter trailers in tight urban environments. The tires, wheels, axles, drive shaft, differentials, and other wheel components also create drag.

Cargo trailers have a similarly tall and wide box-shaped profile that creates drag because the enclosed cargo space of a trailer is often rectangular in shape. The most common type of cargo trailer in the U.S. is a dry box van that is 53 feet long. Most common cargo trailers typically have two "tandem" axles at the rear, each of which has a pair of wheels for 8 wheels on the trailer. Tires and wheels on trailers can also be replaced with single wides, reducing the total number of tires and wheels on the trailer from 8 to 4. Again, the tires, wheels, axles, and other wheel components create drag. A cargo trailer also typically includes landing gear, which includes legs that the trailer rests upon when detached from a tractor. The landing gear can also create drag.

Certain devices are known in the art, such as trailer side-skirts, fairings, trailer end caps, boat tails, and the like, which attempt to address certain areas of drag on a vehicle. However, many of these devices have significant limitations in their ability to reduce drag or their ability to be easily integrated into fleet operations. As a result, a comprehensive solution for improving drag on a vehicle is still needed.

Thus, a need exists for devices that are designed to provide drag reduction for a vehicle trailer. Methods relating to the utilization of such devices would also be beneficial. Retrofit kits for incorporating such devices into vehicles would also be beneficial.

SUMMARY

In accordance with certain embodiments of the present disclosure, a vehicle trailer is provided. The trailer includes a roof and a floor separated from each other by a pair of walls that extend along the length of the floor. The roof has a front edge and a rear edge and the walls have a height that extends from the floor to the front edge of the roof, the height being substantially the same along at least a portion of the length of the walls.

The vehicle trailer further comprises an apparatus for reducing the drag of the trailer through reduction in the size of the wake behind the trailer, increasing the pressure in the wake, and reducing the drag of the wheel and suspension components underneath the trailer.

In accordance with certain embodiments of the present disclosure, the apparatus can include an aerodynamic rain gutter component having a front edge and rear edge which is positioned on the roof adjacent to the rear edge of the roof such that the front edge of the rain gutter component contacts the roof and the rear edge of the rain gutter component does not contact the roof. The apparatus can further include a pair of fairings configured to be positioned on opposite sides of a trailer in front of wheels on the bottom of a trailer, a pair of fairings configured to be positioned on opposite sides of a trailer behind the wheels on the bottom of a trailer, with both pairs of fairings placed and shaped to direct the air smoothly around the wheels and tires and through the center of the trailer. The apparatus can also include a ramp in front of the suspension components, aerodynamically shaped wings on the axles, and a rear diffuser, such components configured to direct air smoothly between the trailer suspension and the ground. The directed high energy air from the apparatus results in a reduced trailer base drag.

In still other embodiments of the present disclosure, a vehicle trailer is provided. The vehicle trailer includes a roof and a floor separated from each other by a pair of opposing walls that extend along the length of the floor. The roof, floor, and walls define a space accessible by a trailer door with each of the walls having a front edge and a rear edge and having a height that extends from the floor to the roof. The height is substantially the same along at least a portion of the length of the walls. The vehicle trailer further includes a pair of side wall fairings having a leading edge and trailing edge. Each side wall fairing is positioned on a different wall from the other adjacent to the rear edges of each of the walls such that the leading edge of each side wall fairing contacts the wall and the trailing edge of each side wall fairing does not contact the wall. Each side wall fairing has an upward incline and downward incline.

In yet other embodiments of the present disclosure, a vehicle trailer is described. The trailer includes a roof and a floor separated from each other by a pair of side walls and a rear wall. The pair of side walls extend along the length of the floor. The roof has a front edge and a rear edge. The side walls have a height that extends from the floor to the front edge of the roof. The height of the side walls is substantially the same along at least a portion of the length of the walls. The trailer further includes a rain gutter component having a front edge and rear edge, the rain gutter component being positioned on the roof adjacent to the rear edge of the roof such that the front edge of the rain gutter component contacts the roof and the rear edge of the rain gutter component does not contact the roof. The rain gutter component has an upward incline and downward incline such that the distance between the rear edge of the rain gutter component and the floor is less than the average height of the side walls. Additionally, the trailer further includes a shelf component. The shelf component is separate from the rain gutter component. The shelf component extends from the rear wall and includes a sloped surface.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which.

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

The present disclosure is generally directed to devices and methods for reducing vehicle drag caused by vehicle trailers. In this regard, the term vehicle can refer to any type of vehicle. In particular, however, the present disclosure specifically contemplates use with heavy trucks, such as tractors and trailers connected thereto. The present disclosure identifies key areas in which modifications to conventional trailers can result in great reductions in vehicle drag, which can translate into improved fuel economy, reduced emissions of carbon dioxide, as well as other improved efficiencies.

As used herein, drag (also referred to as air resistance or fluid resistance) refers to forces that oppose the relative motion of an object through a fluid (a liquid or gas). Drag forces act in a direction opposite to the velocity of the vehicle. Unlike other resistive forces such as dry friction, which is nearly independent of velocity, aerodynamic drag forces are dependent on the square of the velocity. For a solid object moving through a fluid, the drag is the component of the net aerodynamic or hydrodynamic force acting opposite to the direction of the movement. Therefore drag opposes the motion of the object, and in a powered vehicle it is overcome by thrust provided by the engine through the vehicle's drive train.

Figure 1A:
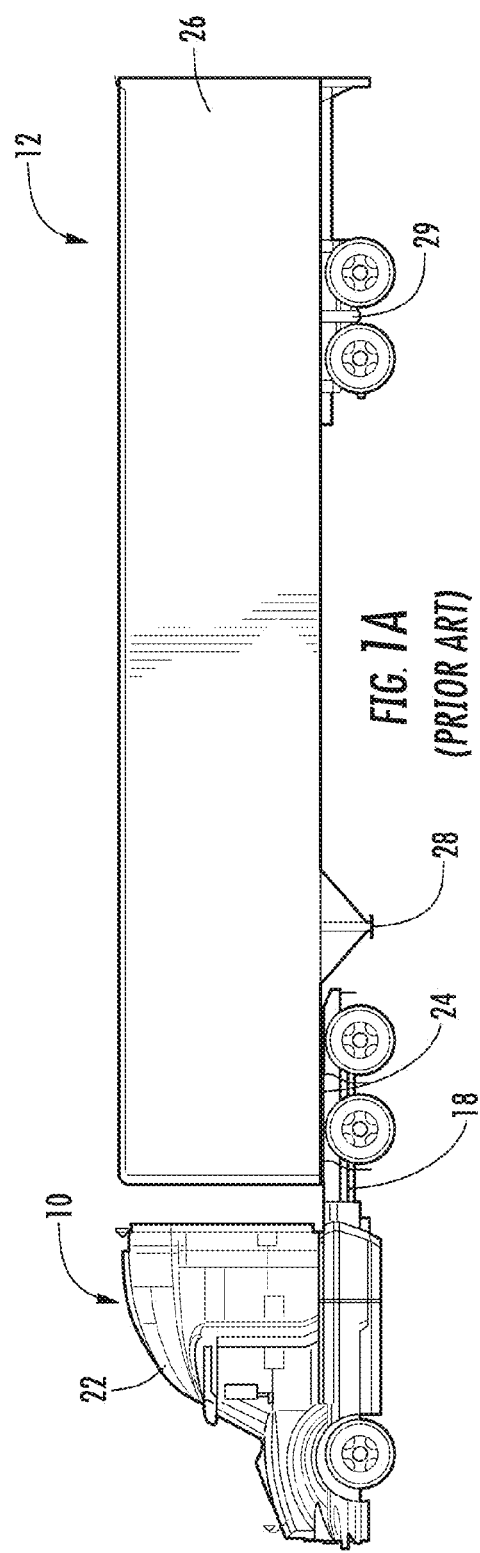
FIGS. 1A and 1B illustrate a conventional tractor-trailer combination.
Figure 1B:
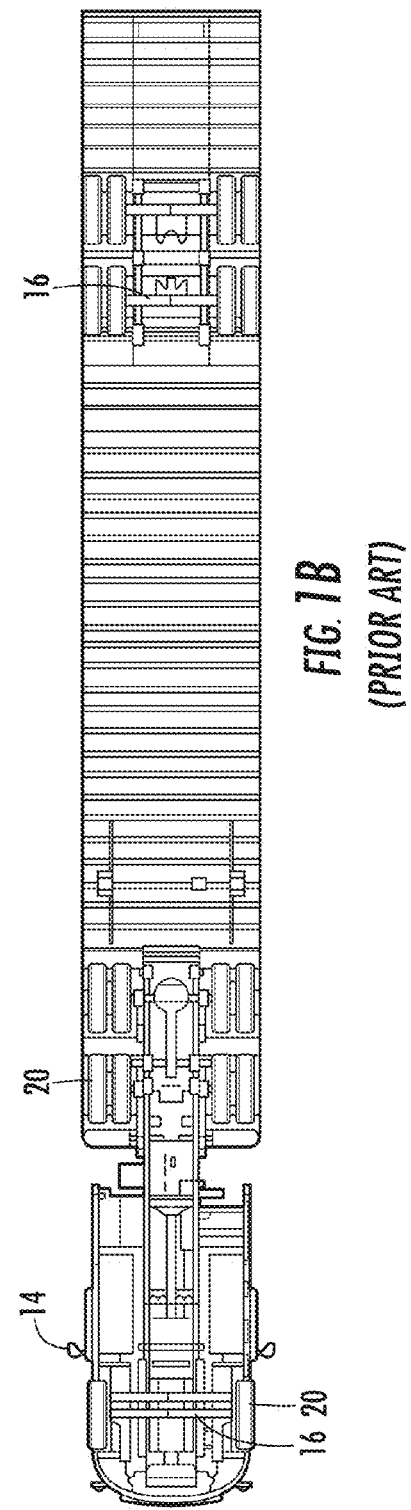

Turning to FIGS. 1A and 1B, a conventional tractor with sleeper compartment 10 with trailer 12 is illustrated. FIG. 1A is a side view of the tractor 10 with trailer 12 and FIG. 1B illustrates the underside. A conventional tractor with sleeper 10 is shown as opposed to cab over engine design, which is also contemplated as a type of vehicle that can be used with the present disclosure. A standard 53 foot long dry box van trailer is illustrated but trailers of any length are contemplated for use with the present disclosure Tractor 10 includes side mirrors 14, axles 16, drive shaft 18, and wheels 20. Tractor also includes air dam 22. Trailer 12 is joined to semi-trailer truck 10 at coupling point 24 typically referred to as the $5^{th}$ wheel. Trailer 12 includes an enclosed cargo space 26. Enclosed cargo space 26 is generally rectangular in shape. Trailer 12 also includes landing gear 28, axles 16, wheels 20, and suspension 29.

Figure 1C:
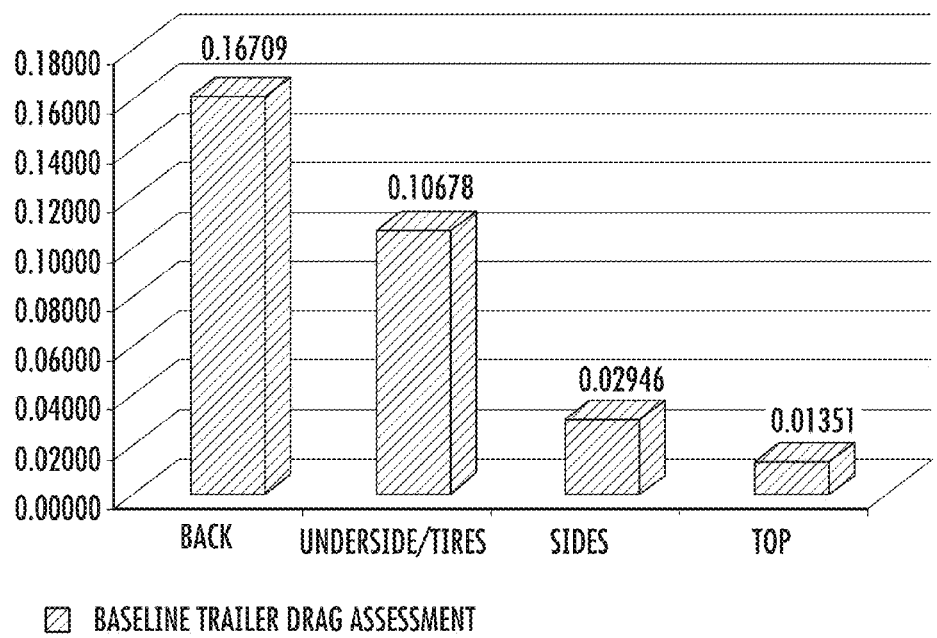
FIG. 1C illustrates a drag assessment of a conventional trailer.
Figure 5A:
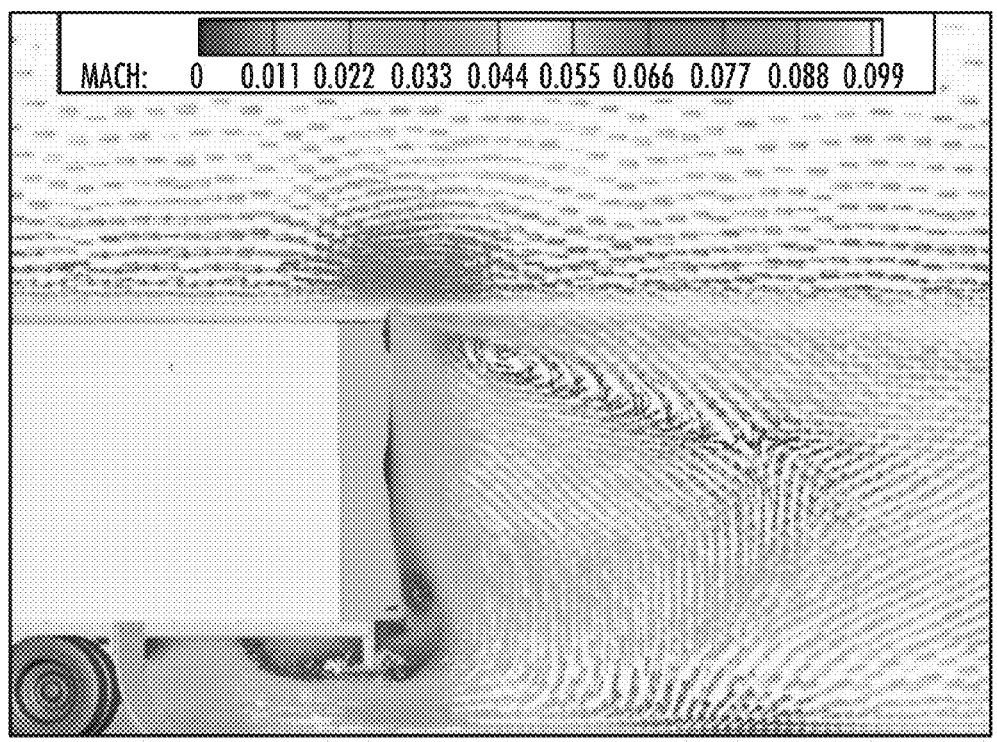
FIG. 5A illustrates a low pressure wake that forms at the rear of a conventional trailer when being pulled at highway speed.

As discussed previously, many of the above-described components create drag during operation of the vehicle. FIG. 1C illustrates a drag assessment of a standard dry van trailer. The trailer back is responsible for creating the largest amount of drag on the vehicle. This is due to a low pressure wake that forms at the rear of the trailer when being pulled at highway speeds. The low pressure wake is formed because air behind the trailer is moving at a very low speed relative to the highway speed of the traveling vehicle. This low pressure wake pulls the vehicle back, creating the significant drag force. FIG. 5A shows an image of a low pressure wake that has formed at the rear of a conventional trailer being pulled at 65 miles per hour. In addition to the trailer back, the trailer underside and tires also create a significant amount of drag as the air collides with the tires, axles, and other fixtures underneath the trailer. The top and side surfaces of the trailer also create drag, although the drag is a relatively small amount compared to the back and underside/tires.

In accordance with the present disclosure, certain improvements are described which can significantly reduce vehicle drag.

Figure 2A:
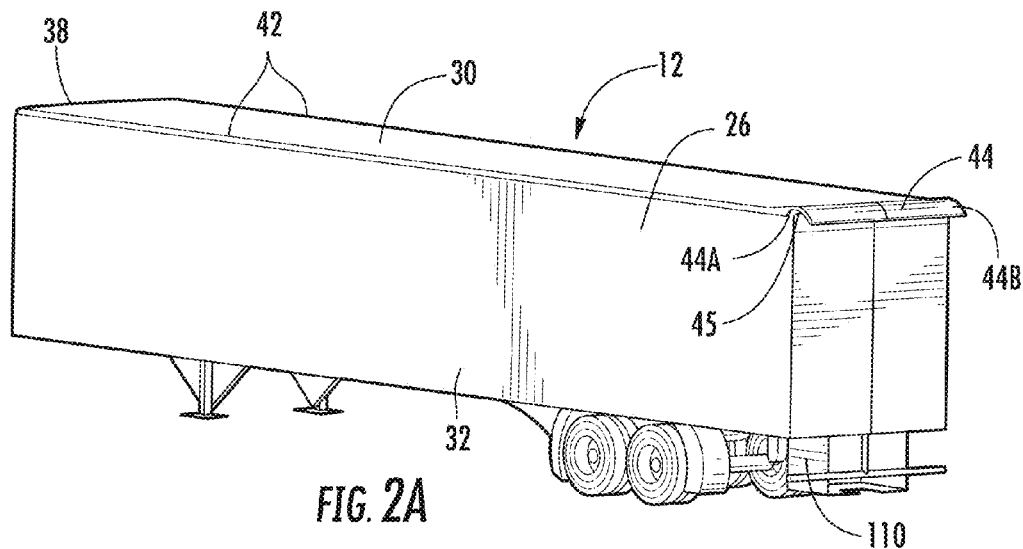
FIGS. 2A and 2B illustrate perspective views of a trailer in accordance with certain embodiments of the present disclosure.
Figure 2B:
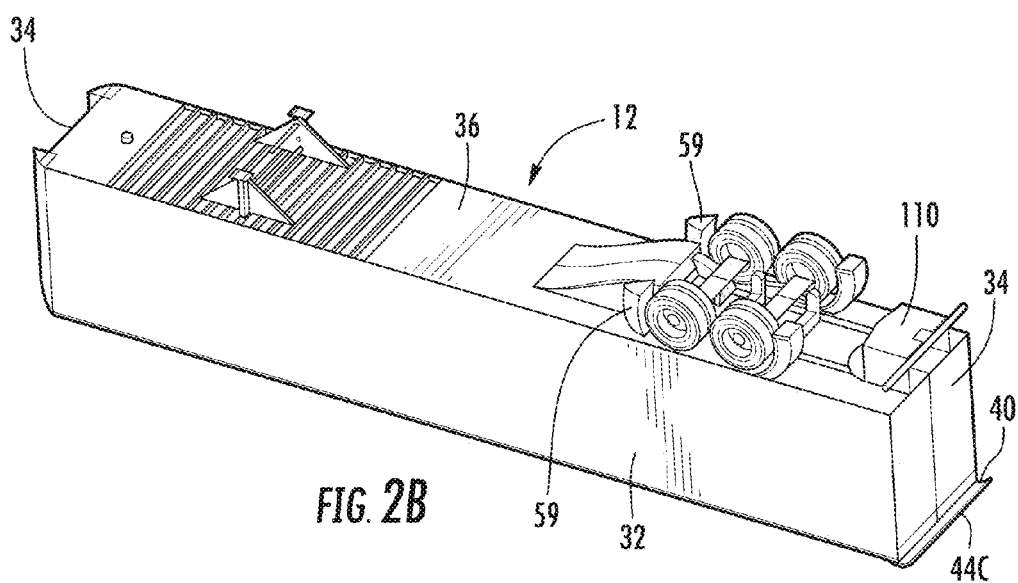

Referring to FIGS. 2A and 2B, perspective views of a trailer in accordance with the present disclosure are illustrated. The illustrated trailer 12 can be joined to a tractor (not shown).

Trailer 12 includes roof 30, two side walls 32, two edge walls 34, and floor 36, which define a space 26 for transport of cargo. Roof 30 includes a front edge 38 (oriented toward the front of the trailer), rear edge 40 (oriented toward the rear of the trailer), and two side edges 42 (extending along the sides of the trailer). Each edge is generally straight. Side walls 32 separate roof 30 from floor 36 and extend along the length of floor 36. As shown in FIG. 2A, side walls 32 have a height that is substantially uniform across the length of each wall 32 except toward the rear edge 40 of trailer, where the height of each wall varies as described further herein. The height for a portion of each wall extends from floor 36 to the height of the front edge 38 of roof 30 again, except toward the rear edge 40 of trailer, where, in certain embodiments, the height can increase and then decrease in conformity to the sloped surface of rain gutter component 44 (described further below) adjacent thereto. Edge walls 34 face the front of the trailer and rear of the trailer. Rear edge wall 34 can provide access into space 26 as will be described in more detail.

In accordance with the present disclosure, aerodynamic rain gutter component 44 is illustrated. Rain gutter component 44 can be positioned adjacent to rear edge 40 of roof 30, over the existing rain gutter on the trailer and be configured so as to have a portion 44A that angles away from floor and a portion 44B that angles back towards floor to points above and below the plane defined by the roof 30. Rain gutter component 44 has a curved, sloping surface. In certain embodiments, side walls of rain gutter component 44 similarly increase in height and decrease in height in conformity with the slope, which results in a portion of each side wall 45 extending above the height of roof 30. When installed, rear edge 44C of rain gutter component has a lower distance to the ground and/or floor 36 than front edge of roof 38 and/or the side walls 45 (if present) adjacent to rear edge except for the portion of each side wall (if present) immediately adjacent to rear edge 44C, such portion (if present) having a substantially identical distance to ground and/or floor 36 with rear edge 44C. For instance, when the rain gutter component is installed, the distance between rear edge 44C and floor 36 can be from about 100 inches to about 105 inches. The length of rain gutter component 44 that is curved can vary. The length of rain gutter component 44 can be from about 16 inches to about 40 inches (by comparison, in certain embodiments, the total length of roof 30 on a standard 53 foot dry van trailer can be about 636 inches). Similarly, width of rain gutter component 44 that is angled can vary. The width of rain gutter component 44 is typically the same width as the trailer and can be from about 100 inches to about 102 inches (by comparison, in certain embodiments, the width of roof 30 can also be from about 100 inches to about 102 inches). The height of aerodynamic rain gutter component 44 from the trailer roof 30 is about 1 inch to about 3 inches. Portion 44A can be angled at an angle from about 5 degrees to about 15 degrees, more particularly at an angle of about 9 degrees to about 11 degrees and portion 44B can be angled at an angle from about 10 degrees to about 20 degrees, more particularly at an angle of about 12 degrees to about 16 degrees. In some embodiments, rain gutter component 44 is substantially a curved panel. The thickness of such a rain gutter component 44 can be from about ⅛ inch to about ¼ inch.

In certain embodiments, additional flap 47 can extend from rear edge 44C and rain gutter component 44 and can articulate between various different angles. For example, when installed, flap 47 continues the curve shown in FIGS. 3A and 3B but can be co-planar with rear edge wall 34 in a first mode, and then pivot into a second mode in which flap 47 continues along the angle of portion 44B in the direction of the ground. It is contemplated that at times, access to space 26 results in flap 47 being adjusted or flexed accordingly. For instance, flap 47 can be split in two halves along the center to correspond with the doors that form rear edge wall 34. In such embodiments, flap 47 would be generally flush with rear edge wall 34 when space 26 is being accessed by opening such doors. To provide needed flexibility, flap 47 can be made of flexible material as would be understood by one of ordinary skill in the art. For instance, rubber or the like can be utilized for flap 47.

Flap 47 can have a length from about 6 inches to about 15 inches and a width from about 100 inches to about 102 inches. Further, flap 47 can have a thickness from about ⅛ inch to about ¼ inch.

Figure 3A:
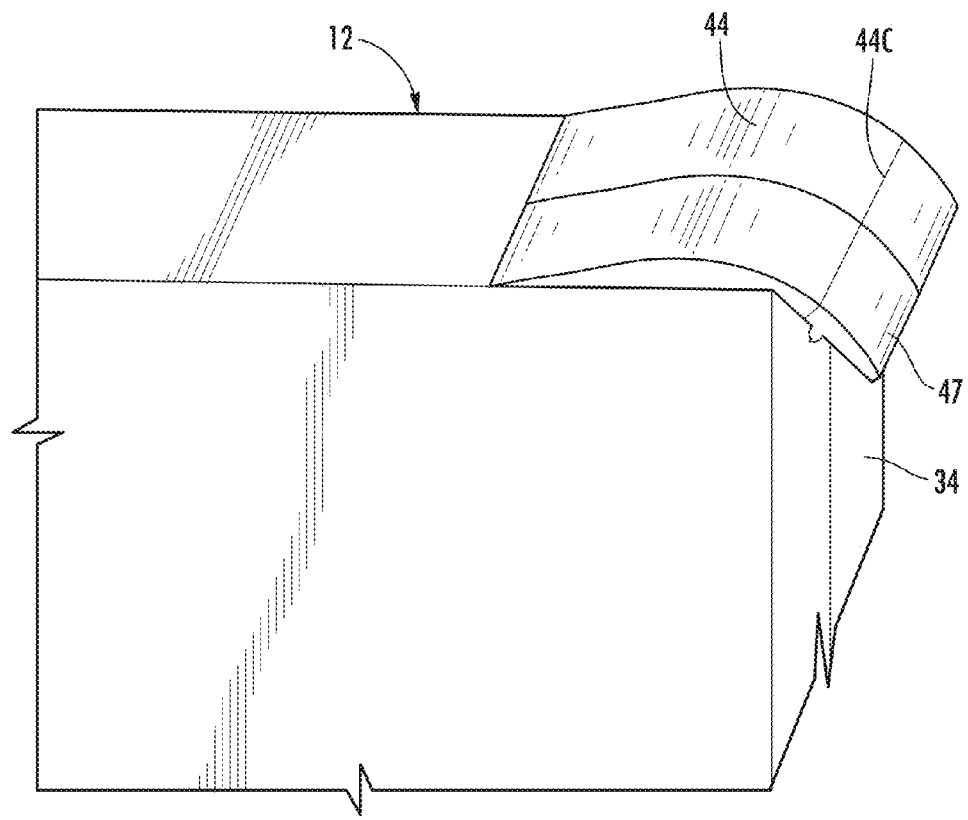
FIG. 3A illustrates a perspective view of a trailer in accordance with certain embodiments of the present disclosure.
Figure 3B:
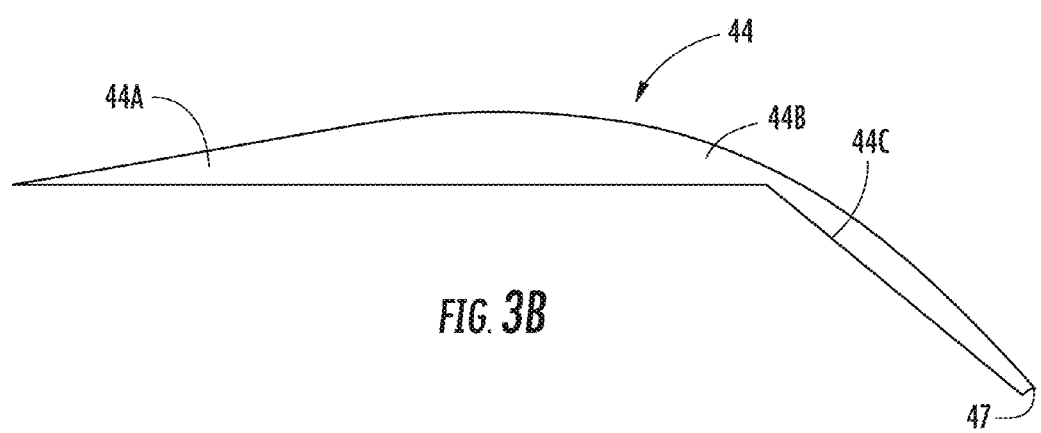
FIG. 3B illustrates a plan view of a rain gutter component in accordance with certain aspects of the present disclosure.

Referring to FIGS. 3A and 3B, a flap 47 in accordance with the present disclosure is illustrated. In such embodiments, flap 47 extends beyond rear edge wall 34 such that the total length of roof 30 and flap 47 is greater than the length of floor 36. For instance, flap 47 can extend from about 4 inches to about 10 inches past rear edge wall 34.

As discussed above, rear edge wall 34 can provide access into space 26 as would be understood by one of ordinary skill in the art. One such embodiment is illustrated in FIG. 2A. For example, if flap 47 is capable of articulating, rear edge wall 34 can include a component that can permit adjustment across certain angles. In addition, rear edge wall 34 can be a conventional sliding door or conventional swing doors as are found on conventional trailers, with the size adjusted to accommodate the rain gutter component 44 and/or flap 47.

In accordance with the present disclosure, certain other aspects are described. For instance, fairings can reduce the drag of the trailer as a result of certain trailer components.

Turning again to FIG. 2B, another pair of fairings is illustrated. The pair of components 58 is positioned in front of wheels 20 and/or wheel assemblies 20. In this regard, a wheel assembly includes any combination of wheels, tires, axles, differentials, and other wheel-related structure, such as struts, shocks, springs, control arms, brake components, or the like. The components are configured to direct fluid flow between the pairs of wheels 20.

Figure 4A:
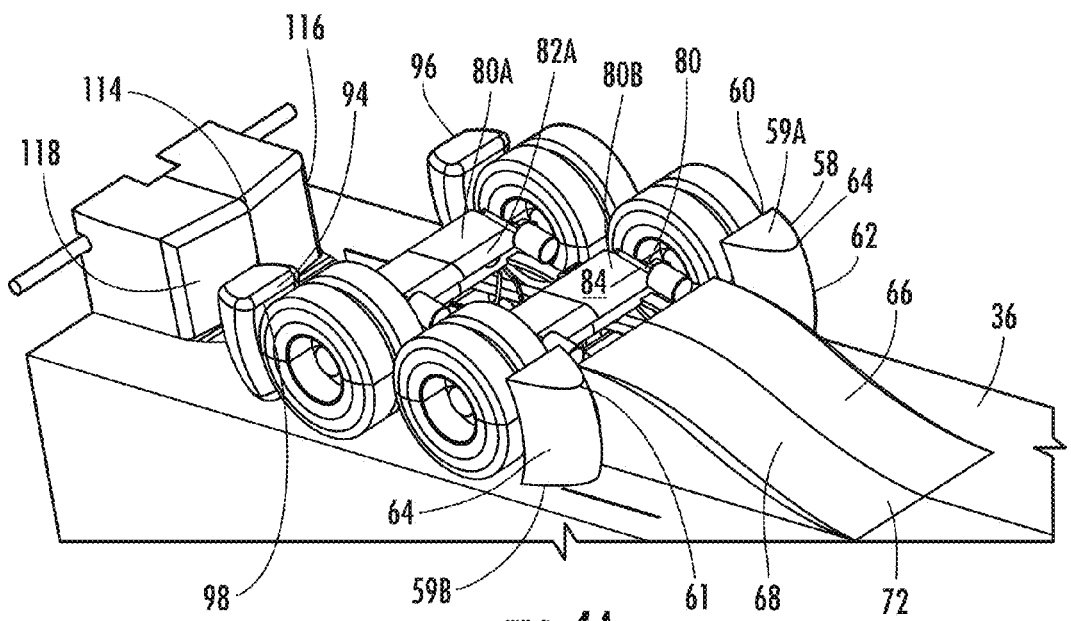
FIGS. 4A and 4B illustrate perspective views of a trailer in accordance with certain embodiments of the present disclosure.
Figure 4B:
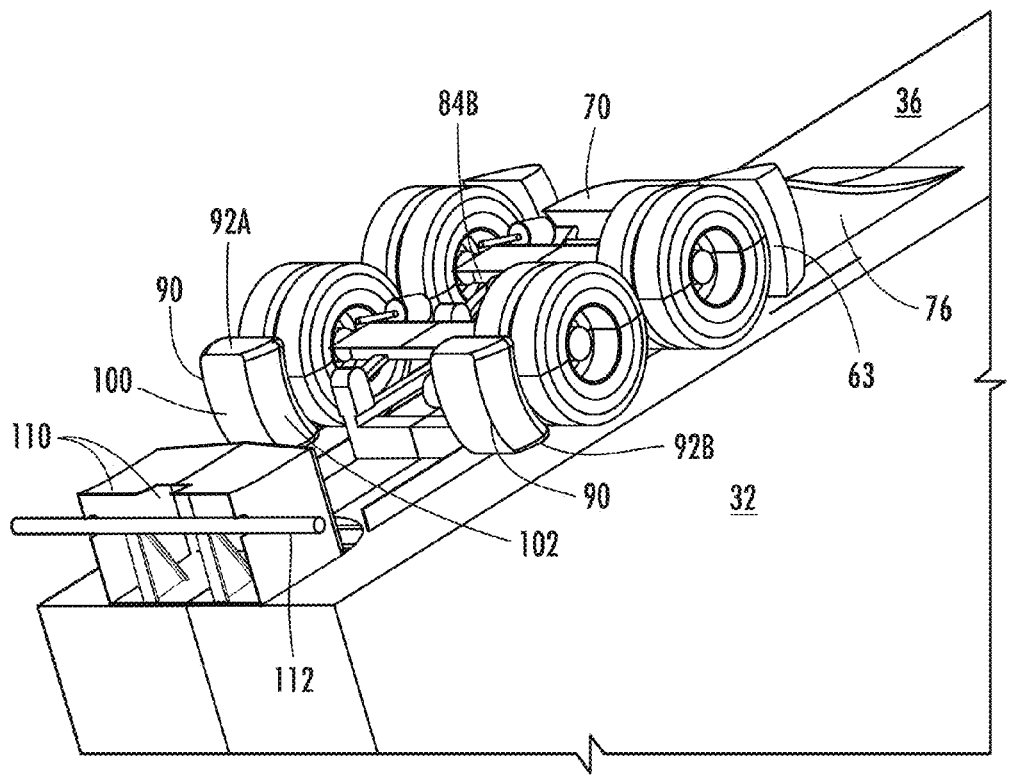

Referring to FIGS. 4A and 4B, each component 58 has a generally parabolic shaped cross-section that is generally parallel to bottom surface 36. For example, each component has a generally flat bottom surface 59A and top surface 59B that are generally parallel to bottom surface 36 with the bottom surface 59A and top surface 59B having a generally straight edge 60 and a generally curved edge 61. The leading portion 62 of component 58 is oriented toward the front of the trailer 12 and the trailing portion 63 is oriented toward the rear of the trailer 12 with the side portions 64 connecting the leading portion 62 and trailing portion 63. The leading portion 62 is curved in conformity with the parabolic shaped cross-section and curved edge 61. In addition, the leading portion 62 is curved as it extends from the bottom surface 59A to the top surface 59B thereof. The trailing portion 63 curves inward towards the front of trailer 12 as it extends from bottom surface 59A to top surface 59B such that the trailing portion 63 is generally complimentary to the curve of one or more adjacent wheels 20.

Each component 58 can be generally identical and positioned, as discussed above, oriented on opposite sides of trailer in front of each pair of wheels 20. Each component 58 can have a length from about 12 inches to about 28 inches. In addition, each component can have a width from about 16 inches to about 27 inches. Each component can have a height from about 19 inches to about 42 inches. For instance, the length, width, and height can be comparable to that of each pair of wheels.

Turning again to FIG. 4A, sloped component 66 can be positioned in front of wheel assemblies 58, with, in certain embodiments, at least a portion positioned in between components 58. The sloped component 20 can have one or more sloped surfaces 68 that slope from bottom surface 36 to a generally flat surface 70. The leading portion 72 of sloped component is generally flush with bottom surface 36 of trailer with the surface 68 of sloped component 66 sloping downward in the direction of the ground. The angle of slope can be from about 15 degrees to about 33 degrees. Side portions 76 of sloped component 66 are generally coplanar with trailer side walls 32.

Sloped component 66 can have a length from about 36 inches to about 114 inches. In addition, sloped component 66 can have a width from about 30 inches to about 68 inches. Sloped component 66 can have a height from about 16 inches to about 40 inches. For instance, the width can be configured so that at least a portion of sloped component 66 fits in between components 58.

Referring again to FIGS. 4A and 4B, sloped component 66 directs airflow underneath one or more axle components 80, which may or may not be integrally formed with sloped component 66. Axle component(s) 80 is configured to be placed over the axle 16 of trailer 12. Axle component(s) 80 can be in the form of one or more axle wings that have a curved front portion 82 and a generally flat body 84. Axle component(s) 80 can have a length from about 12 inches to about 36 inches. In addition, axle component(s) 80 can have a width from about 23 inches to about 68 inches. Axle component(s) 80 can have a thickness from about ⅛ inch to about ½ inch. For instance, the width can be configured so that at least a portion of axle component(s) 80 fits in between wheels 20 of one or both axles 16.

For instance, in certain embodiments, two axle component 80A and 80B can be generally identical and positioned, as discussed above, oriented over the axle of trailer in between each pair of wheels 20 such that sloped portion 82A of the rear axle component 80A is adjacent to the flat body 84B of the forward axle component 80B.

Turning again to FIG. 4B, yet another pair of fairings is illustrated. The pair of rear components 90 is positioned in behind wheels 20 and/or wheel assemblies 20.

Referring to FIGS. 4A and 4B, each rear component 90 has a generally wedge shaped cross-section that is generally parallel to bottom surface 36. For example, each component has a generally flat bottom surface 92A and top surface 92B that are generally parallel to bottom surface 36 with the bottom and top surfaces 92A and 92B having a generally straight edge 94 and a generally curved edge 96. The leading portion 98 of rear component 90 is oriented toward the front of the trailer 12 and the trailing portion 100 is oriented toward the rear of the trailer 12 with the side portions 102 connecting the leading portion 98 and trailing portion 100. The leading portion 98 is curved generally complimentary to the curve of one or more adjacent wheels 20. In addition, the leading portion 98 is curved as it extends from the bottom surface 92A to the top surface 92B thereof. The trailing portion 100 curves outward towards the rear of trailer 12 as it extends from bottom surface 92A to top surface 92B.

Each rear component 90 can be generally identical and positioned, as discussed above, oriented on opposite sides of trailer in behind each pair of wheels 20 such that they are in a mirror-image orientation. Each rear component 90 can have a length from about 12 inches to about 30 inches. In addition, each component can have a width from about 14 inches to about 27 inches. Each component can have a height from about 16 inches to about 36 inches. For instance, the length, width, and height can be comparable to that of each pair of wheels.

As shown in FIGS. 2A and 2B, the present disclosure further includes a diffuser 110. The diffuser 110 can include an integrated bumper 112 or can be placed around an existing bumper (as illustrated in FIG. 4B). Diffuser 110 can have a generally rectangular cross section and can be positioned behind rear wheel assemblies 20 adjacent to the rear end of trailer 12. The diffuser 110 can define a cut-out 111 of any suitable shape or size to enable the trailer to be positioned adjacent to a loading dock and/or attached to a loading dock. Diffuser 110 can include one or more sloped surfaces 118 that slope from the center 114 towards the sides 116. The angle of slope can be from about 0 degrees to about 26 degrees. As seen in FIG. 4B, diffuser 110 can be hollow and the diffuser can have an open face or can have a closed rear face making the diffuser a sealed cube like object.

Diffuser 110 can have a length from about 14 inches to about 98 inches. In addition, diffuser 110 can have a width from about 26 inches to about 102 inches (the full width of the trailer). Diffuser 110 can have a height from about 25 inches to about 42 inches. For instance, as with the other components, the length, width, and height can be comparable to that of each pair of wheels.

Figure 7A:
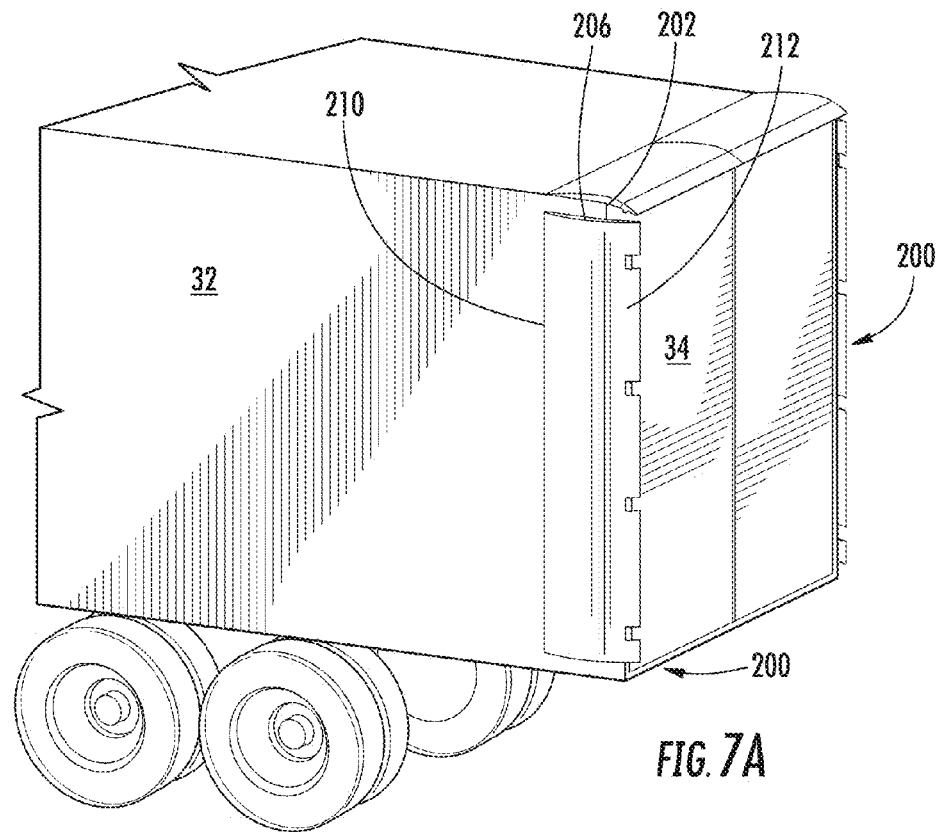
FIGS. 7A and 7B illustrate perspective views of a trailer in accordance with certain embodiments of the present disclosure.
Figure 7B:
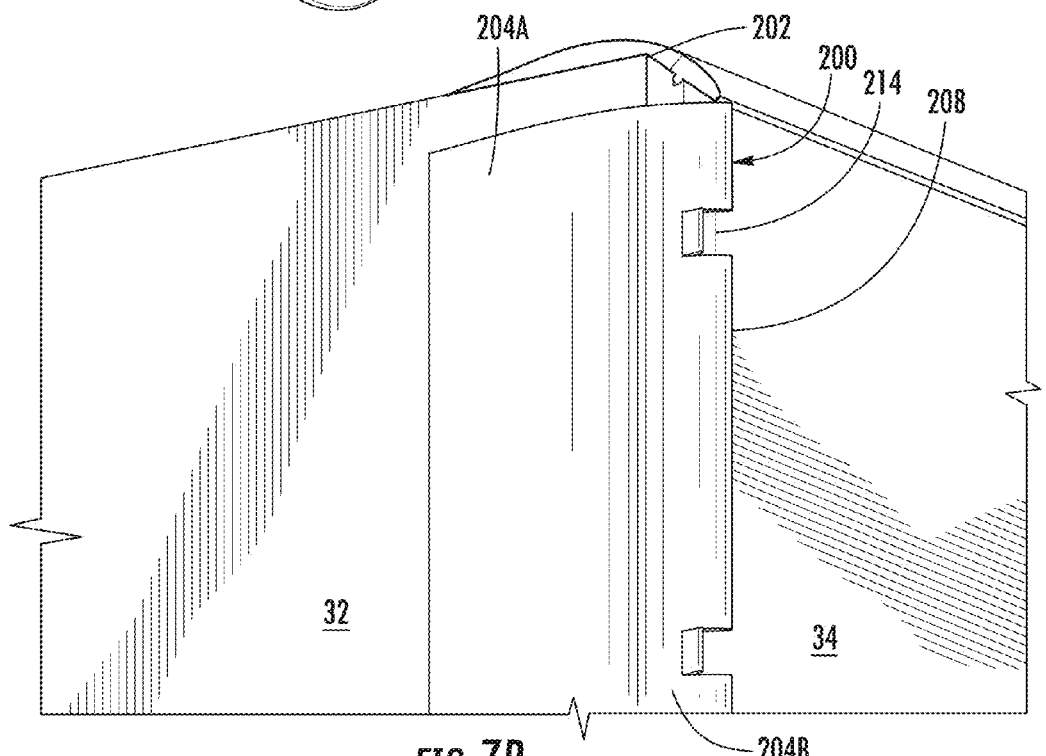

In certain embodiments of the present disclosure, one or more side wall fairing(s) 200 are illustrated. Referring to FIGS. 7A and 7B, side wall fairings 200 are illustrated adjacent to the intersections 202 between rear edge walls 34 and side walls 32. Side wall fairing 200 can be positioned adjacent to such intersections 202, which form the side rear corners of trailer 12. Side wall fairings 200 are configured so as to have a portion 204A that angles away from side wall 32 and a portion 204B that angles back towards side wall 32 to points above and below the plane defined by the side wall 32. Side wall fairing 200 has a curved, sloping surface. In certain embodiments, side walls 206 of side wall fairing 200 similarly increase in height and decrease in height in conformity with the slope, which results in a portion of each side wall 206 extending away from side wall 32. When installed, rear edge 208 of side wall fairing 200 extends beyond intersection 202 and extends beyond the plane defined by side wall 32 while leading edge portion 210 of side wall fairing 200 is above the plane defined by side wall 32. When the side wall fairing is installed, the distance that rear edge 208 extends beyond intersection 202 is from about 0 inches to about 10 inches. The length of side wall fairing 200 can vary. The length of side wall fairing 200 can be from about 16 inches to about 40 inches (by comparison, in certain embodiments, the total length of side wall 32 on a standard 53 foot dry van trailer can be about 636 inches). Similarly, height of side wall fairing 200 can vary. The height of side wall fairing 200 can be similar to the height of side wall 32 and can be from about 36 inches to about 117 inches (by comparison, in certain embodiments, the height of side wall 32 can also be from about 117 inches). Alternatively, side wall fairing 200 can be formed by two or more separate components that are joined together when installed, in which case each component has a length and width that when combined with the other component(s) results in a total length and/or width corresponding to that previously described. The depth of aerodynamic side wall fairing 200 extending outward from the trailer side wall 32 is about 1 inch to about 3 inches. Portion 204A can be angled at an angle from about 5 degrees to about 15 degrees, more particularly at an angle of about 9 degrees to about 11 degrees and portion 204B can be angled at an angle from about 10 degrees to about 20 degrees, more particularly at an angle of about 12 degrees to about 16 degrees. In some embodiments, side wall fairing 200 is substantially a curved panel having a similar if not identical profile to rain gutter component 44 described previously. The thickness of such a side wall fairing 200 can be from about ⅛ inch to about ½ inch.

In certain embodiments, rear edge 208 of side wall fairing 200 is part of a rear extension 212 that extends beyond intersection 202 defined by edge wall 34 and side wall 32. Rear extension 212 can have a length from about 6 inches to about 15 inches and a height from about 36 inches to about 117 inches. Further, rear edge fairing can have a thickness from about ⅛ inch to about ½ inch. When installed, rear extension 212 can be attached to the trailer side wall 32 and any suitable portion of the trailer rear end frame (comprising intersections 202 which are separated from one another by roof rear edge 40 and the equivalent floor rear edge) rather than the doors that define rear edge wall 34. In still other embodiments, rear extension can be integral with the previously described portions 204A and 204B. Rear extension is configured to not interfere with the trailer door operation. For instance, in certain embodiments, side wall fairing 200, and more particularly rear extension 212, can define one or more slots 214 so as to clear trailer door hinges when side wall fairing 200 is installed on a trailer. In this manner, side wall fairing 200 can provide aerodynamic improvements that are independent of loading and trailer door operation. Similarly, in embodiments of the present disclosure in which side wall fairing 200 is utilized in conjunction with the previously described rain gutter component 44, side wall fairing is positioned and configured so as to not make contact with rain gutter component 44.

Figure 9A:
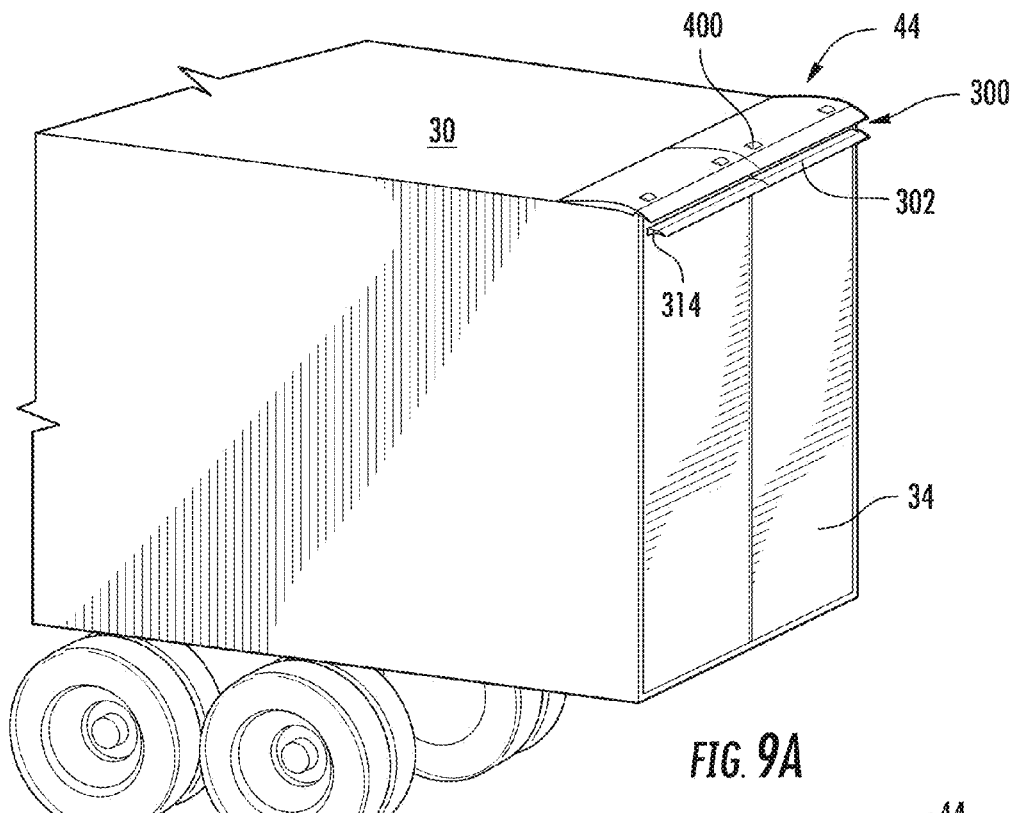
FIG. 9A illustrates a perspective view of a trailer in accordance with certain embodiments of the present disclosure.
Figure 9B:
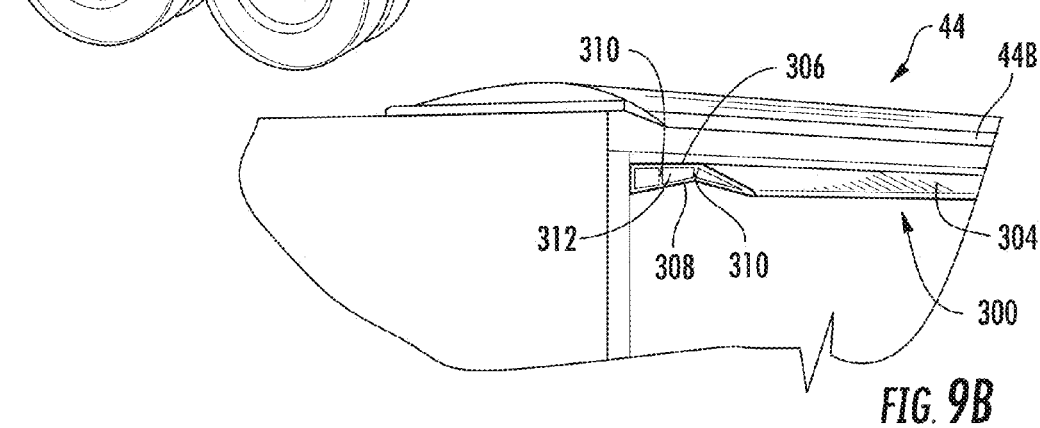
FIG. 9B illustrates a closer view of the perspective view of a trailer in FIG. 9A in accordance with certain embodiments of the present disclosure.
Figure 9C:
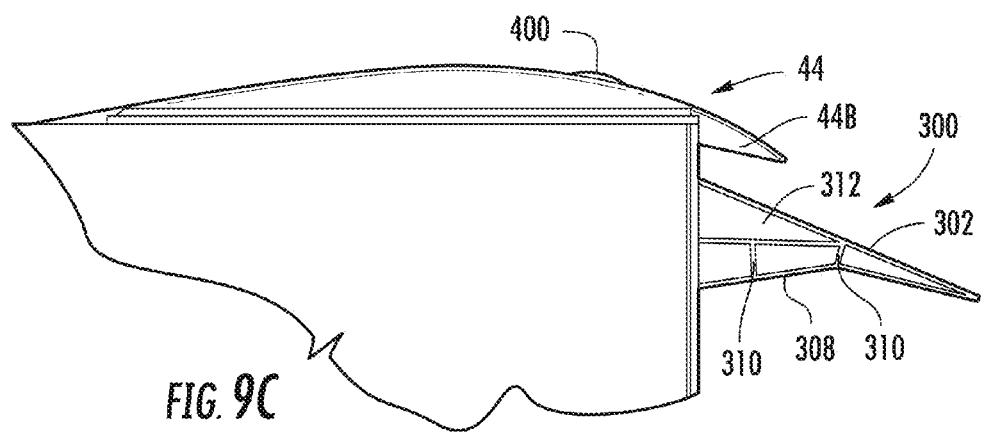
FIG. 9C illustrates a plan view of a rain gutter component and a shelf in accordance with certain aspects of the present disclosure.

In certain embodiments of the present disclosure, shelf component 300 can be present. Referring to FIGS. 9A-9C, shelf 300 is separate from rain gutter component 44 and extends outward from rear edge wall 34. As discussed herein previously, rear edge wall 34 can be a conventional sliding door or conventional swing doors as are found on conventional trailers. In embodiments in which the previously described rain gutter component 44 is present on a trailer with swing doors, the present inventors have determined that the addition of shelf 300 can allow for reduced drag, without the necessity of flap 47. However, it should be understood that shelf 300 can be used with any type of door(s) and/or with or without flap 47, depending on the particular configuration selected in accordance with the present disclosure.

Shelf 300 has a top surface 302 that includes a sloped surface 304 which angles towards the ground. In addition, shelf 300 extends lengthwise across the width of trailer rear edge wall 34. Sloped surface can be angled at an angle of about 10 degrees to about 20 degrees, more particularly at an angle of about 12 degrees to about 16 degrees. Referring to FIG. 9B, sloped surface 304 can extend from generally flat surface 306 which is generally parallel with roof 30. However, as illustrated in FIG. 9C, sloped surface 304 can be substantially all of top surface 302. In certain embodiments, top surface 302 has a length of from about 3 inches to about 15 inches and a width of from about 95 inches to about 102 inches. In certain embodiments, top surface 302 has a length of about 8 inches. The length of sloped surface 304 can vary. For instance, sloped surface 304 can have a length of from about 1 inch to about 15 inches. Similarly, generally flat surface 306 can have a length of from about 1 inch to about 15 inches.

Shelf 300 can also include a bottom surface 308 that is positioned underneath top surface 302 as illustrated in FIGS. 9B and 9C and is joined to top surface 302 by one or more linking components 310 (such that the shelf 300 defines hollow spaces 312) or is instead integral with top surface 302 as a solid structure. Bottom surface 308 can have identical dimensions to top surface 302. In embodiments in which shelf 300 includes hollow spaces 312, shelf 300 may or may not include one or more sidewall(s) 314 joining the edges of top surface 302 and bottom surface 308. Shelf 300 can have a wall thickness of about 0.01 inches to about 0.5 inches. In certain embodiments, at least a portion of top surface 302 can be substantially parallel with a portion of rain gutter component 44, such as portion 44B.

Referring again to FIG. 9A, shelf 300 is installed adjacent to rain gutter component 44 near the upper portion of rear edge wall 34. Shelf 300 is installed on rear edge wall 34 between 0 and about 25 inches beneath the rear edge of roof 40 of trailer (the height of rear edge wall on a standard 53 foot dry van trailer is typically about 117 inches). Shelf 300 can be mounted directly to rear edge wall 34 with appropriate hardware as would be understood in the art. Shelf 300 can also be joined to rear edge wall 34 with hinges and/or other fasteners so as to enable shelf 300 to fold down towards rear edge wall 34. Shelf 300 can be split in two halves along the center to correspond with the doors which form rear edge wall 34. If shelf 300 is installed in two pieces on trailers with swing doors then each top surface 302 has a width of about 45 inches to about 52 inches. Each swing door is typically configured to open approximately 270 degrees outward so as to be almost flush with each side wall 32 that is closest to such swing door. The ability for shelf 300 to be split and articulate between positions enables such swing doors to open to substantially the same position as they would otherwise swing without shelf 300. Shelf 300 can be formed from an elastomeric material, including but not limited to EPM rubber, EPDM rubber, silicone rubber, ethylene-vinyl acetate, thermoplastic elastomers, thermoplastic polyurethanes, polybutadiene, and nitrile rubbers, or combinations thereof, or any other suitable material as further described herein or as would be known to one of ordinary skill in the art.

In this manner, the devices of the present disclosure reduce drag in a number of ways including:

1. Directly minimizing the drag associated with incoming air flow colliding with the tires, axles, brakes, and other mechanisms under the trailer body. The sloped component 66, front wheel assemblies 20, and axle wings 80A and 80B act as fairings to move the incoming air around the tires, axles, brakes and other mechanisms under the trailer body. Additionally, this collection of components keeps the incoming air from separating as the air flows past the mechanisms underneath the trailer.

Figure 5B:
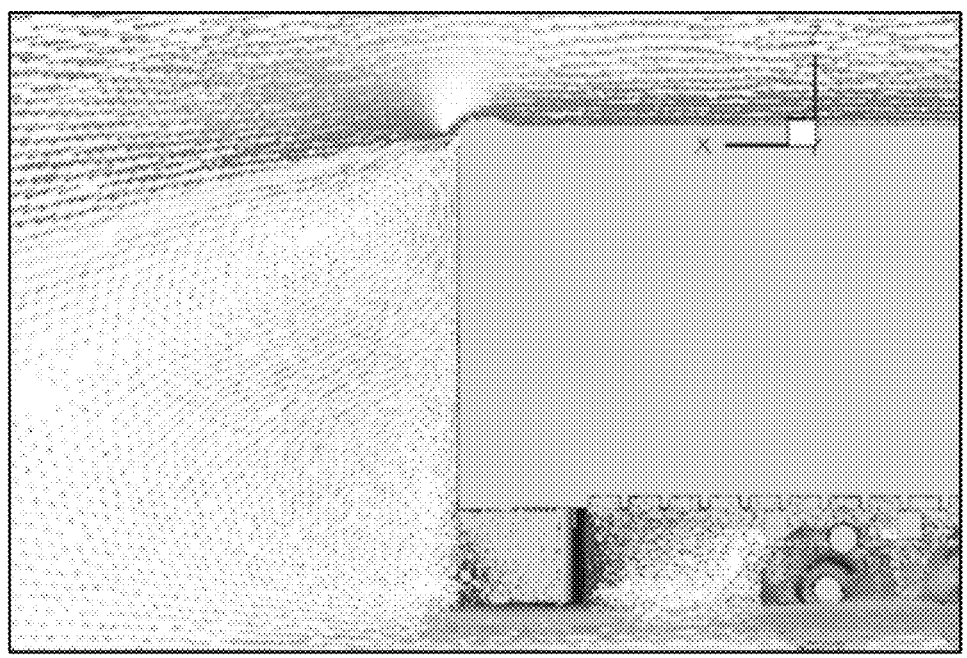
FIG. 5B illustrates reduction in drag by directing the incoming air flow between the trailer wheel assemblies and injecting the high velocity air stream into the trailer wake at the rear of the trailer in accordance with certain embodiments of the present disclosure.

2. Accelerating and compressing the incoming air flow as it travels between the collection of components (66, 58, 80A, 80B, 90, 110), the wheels, and the ground. The components, the wheels, and the ground create a tunnel with a rectangular cross section in which the compressed and accelerated air flows and ultimately is injected below the low pressure wake at the rear of the trailer as shown in FIG. 5B (when compared to a conventional trailer as illustrated in FIG. 5A). At the rear of the trailer, the diffuser 110 deflects the air flow toward the ground at an angle from 3 degrees to 10 degrees as shown in FIG. 5B. Injecting the accelerated and compressed air below the low pressure wake pulls the wake down and reduces its size, the sum of which increases the pressure in the wake, thereby reducing the resulting drag.

Figure 6:
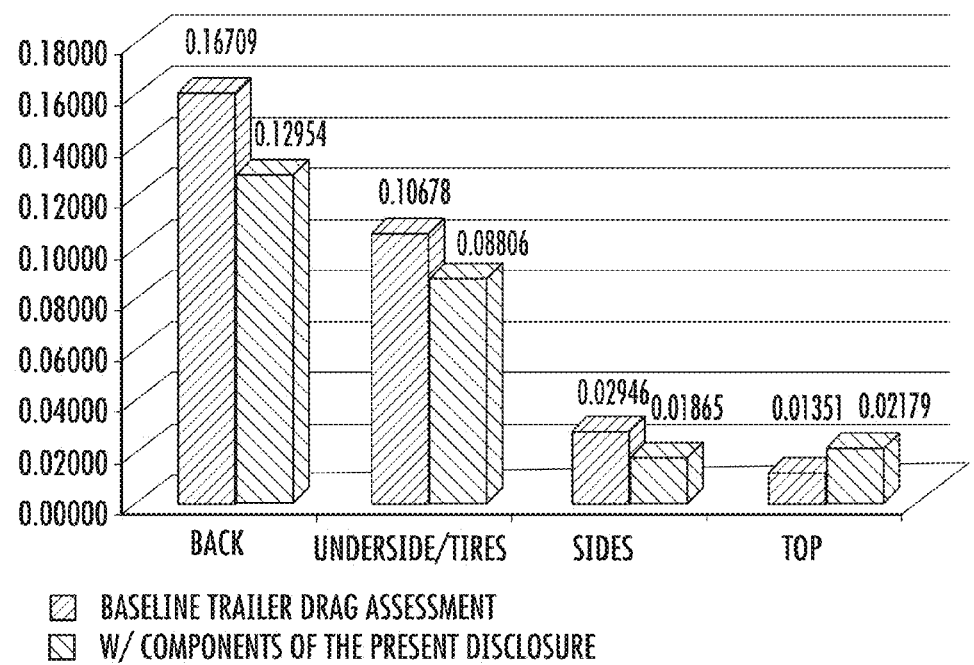
FIG. 6 illustrates the drag contributions from the trailer back, underside, sides, and top and illustrates the reduction in drag from these trailer systems as a result of equipping the trailer with the components of the present disclosure.

3. Directing the attached high velocity incoming air flow from the top of the trailer to the rear of the trailer at a downward angle of approximately 12-15 degrees as shown in FIG. 5B. The aerodynamic rain gutter component 44 and flap 47 keeps the air flow attached and directs the air downward into the low pressure wake. Injecting this high velocity air flow into the low pressure wake reduces the size of the wake and adds energy to it. This increases the pressure in the wake, thereby reducing the resulting drag. FIGS. 5A and 5B compare the flow field at the rear of the trailer without the components of the present disclosure to the flow field of the same trailer that is equipped with the components of the present disclosure. FIG. 6 illustrates the drag contributions from the trailer back, underside, sides, and top and illustrates the reduction in drag from these trailer systems as a result of equipping the trailer with the components of the present disclosure.

Figure 8A:
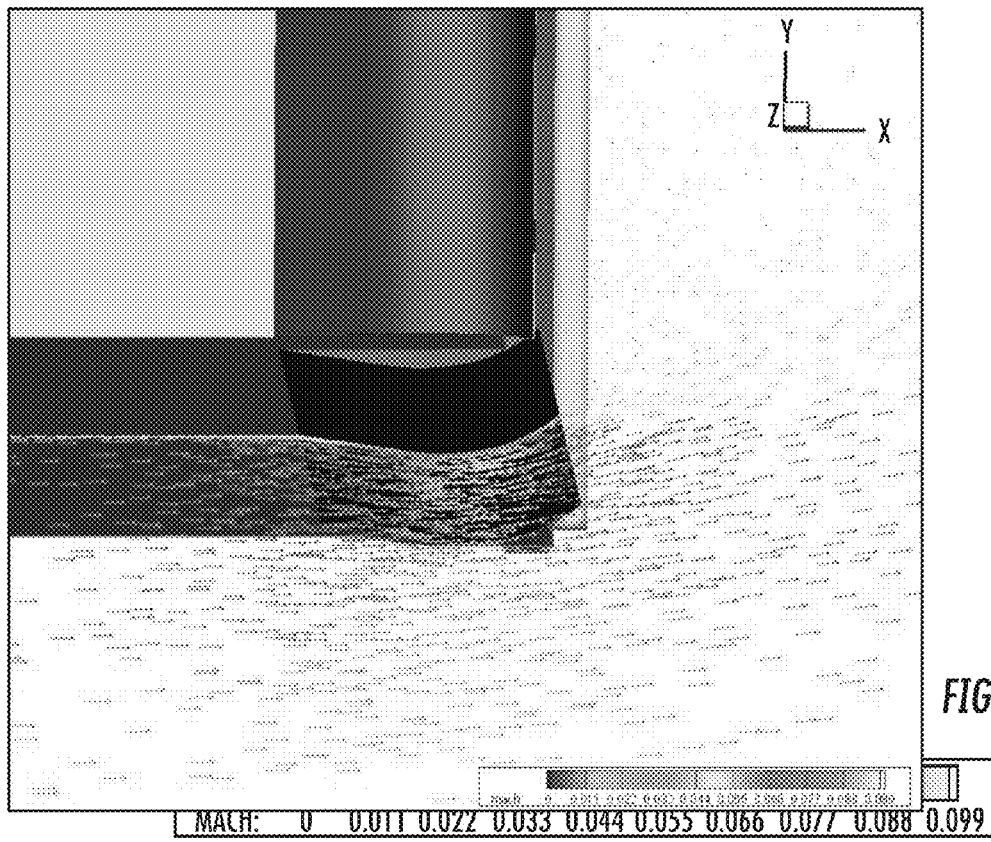
FIGS. 8A and 8B illustrate reduction in drag in accordance with certain embodiments of the present disclosure.
Figure 8B:
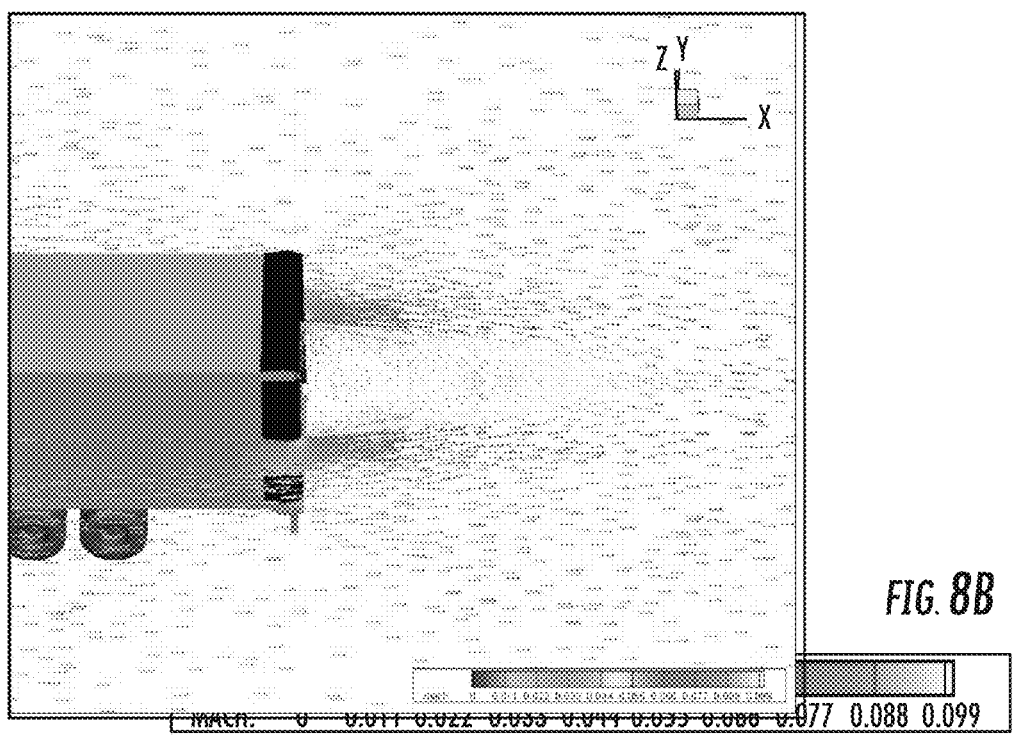

4. Aerodynamically shaped side fairings thin the trailer side boundary layer by accelerating the local flow over the side fairing and then direct the air flow around the trailer edge to reduce the size of the wake and increase the local pressure on the back of the trailer, which substantially reduces trailer drag. FIGS. 8A and 8B illustrate that the side fairing components maintain air flow attachment and direct the air inward into the low pressure wake. Injecting this high velocity air flow into the low pressure wake reduces the size of the wake and adds energy to it. This increases the pressure in the wake, thereby reducing the resulting drag.

It should be understood that while the present discussion and figures describe a dual tire configuration, a single wide tire configuration is also contemplated by the present disclosure. In such embodiments, the present disclosure can be modified as would be understood by one of ordinary skill in the art to achieve the improvements described herein.

All of the above-described elements can be formed from any suitable material as would be known and appreciated in the art. For instance, metals, plastics, or the like can be utilized. Unless otherwise stated, the elements can include a smooth outline to further reduce drag. In addition, it should be appreciated that any suitable mounting hardware including common fasteners (such as nuts, bolts, or the like), latches, hooks, ties, adhesives, magnets, or the like, or any other conventional securing methods as would be known in the art can be utilized in connection with the present disclosure. Similarly, any safety features as would be required by the appropriate regulatory agencies are also contemplated to be included as part of one or more components of the present disclosure in a manner so as to not eliminate the net reduction in drag achieved by the devices described herein. For instance, referring to FIGS. 9A and 9C, required safety lights 400 can be incorporated into the rain gutter component 44 described herein.

It should be understood and appreciated that various combinations of the above described subject matter are contemplated by the present disclosure. In other words, drag improvements can be achieved by using only one of the above-described embodiments, but drag generally improves if more than one component is utilized. In addition, the teachings of the present disclosure can be incorporated into new vehicle and trailer manufacture/sale as well as retrofit kits for upgrading existing vehicles and trailers.

The following examples are meant to illustrate the disclosure described herein and are not intended to limit the scope of this disclosure.

EXAMPLES

Aerodynamic drag associated with trailers, tractor-trailer systems, and components of the present disclosure were all assessed using NASA's Fully Unstructured Navier-Stokes 3D (FUN 3D) Computational Fluid Dynamics (CFD) model described further at http://fun3d.larc.nasa.gov. In addition, the actual fuel savings associated with trailers, tractor-trailer systems, and components of the present disclosure were demonstrated using the industry standard Society of Automotive Engineer's (SAE) long-haul fuel-consumption test J1321 protocol, incorporated by reference herein, in a series of tests at the Continental tire proving grounds in Uvalde, Tex. The long-haul fuel-consumption test provides a standardized test procedure for comparing the in-service fuel consumption of a test vehicle operating under two different conditions relative to the consumption of a control vehicle.

Results of computational fluid dynamics modeling and simulations and SAE J1321 testing are provided in Table IIA. In particular, Table IIA shows that a modern tractor trailer combination equipped with certain elements and components described in the present disclosure has 10% less drag than the same tractor trailer without such components. For a tractor trailer operating on the highway at 65 miles per hour, a 10% reduction in drag results in a 5.5% improvement in fuel efficiency.

As illustrated in Table IIB, the SAE J1321 protocol tests at the Continental tire proving grounds in Uvalde, Tex. demonstrated 6.81% improvement in fuel efficiency at 65 mph.

TABLE IIA

| | Baseline Tractor Trailer | Tractor Trailer Equipped with certain components of the present disclosure | Percent Improvement |
|---|---|---|---|
| Cd as calculated by NASA's FUN 3-D Computational Fluid Dynamics Model | .592 | .5328 | 10% |
| Highway fuel efficiency at 65 miles per hour | 6.25 miles per gallon | 6.587 miles per gallon | 5.4% |

TABLE IIB

| Demonstrated* | | | |
|---|---|---|---|
| Highway fuel efficiency at 65 mph Using SAE J1321 Protocol | 6.252 miles per gallon | 6.678 miles per gallon | 6.81% |

*Test at Continental Tire Proving Grounds in Uvalde, Texas, April 5th-10th 2010.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure.

What is claimed is:

1. A vehicle trailer comprising:
    a roof and a floor separated from each other by a pair of side walls and a rear wall, the rear wall extending between a top rear edge and a bottom rear edge, the pair of side walls extending along the length of the floor, the roof extending between a top front edge and the top rear edge, the side walls having a height that extends from the floor to the top front edge of the roof, the height being substantially the same along at least a portion of the length of the walls; and
    a shelf component extending from the rear wall at a location between the top and bottom rear edges such that the shelf component is spaced apart from both the top rear edge and the bottom rear edge, the shelf component extending in a lengthwise direction between a first end and a second end, the shelf component terminating at the first and second ends, the shelf component including a top side and a bottom side opposite the top side and defining a height between the top and bottom sides, the top and bottom sides extending between a leading edge positioned directly adjacent to the rear wall and a trailing edge spaced apart from the rear wall, at least a portion of the top side defining a sloped surface extending between the leading and trailing edges such that the height varies along at least a portion of the shelf component extending between the leading and trailing edges.

2. The vehicle trailer of claim 1, wherein the sloped surface is angled downwardly at an angle from about 10 degrees to about 20 degrees.

3. The vehicle trailer of claim 1, wherein the shelf component is configured to movably articulate between a range of different angles.

4. The vehicle trailer of claim 1, wherein the sloped surface extends substantially entirely between the leading and trailing edges along the top side.

5. The vehicle trailer of claim 1, wherein the top side defines a flat surface extending outwardly from the rear wall substantially parallel to the roof, the sloped surface extending from the flat surface to the trailing edge.

6. The vehicle trailer of claim 5, wherein a ratio of a length of the flat surface to a length of the sloped surface is substantially 1:1.

7. The vehicle trailer of claim 1, wherein the top side is joined to the bottom side by one or more linking components such that one or more hollow spaced are defined within the shelf component between the top and bottom sides.

8. The vehicle trailer of claim 1, wherein the shelf component is positioned on the rear wall below the top rear edge a distance equal to less than about 25 inches.

9. A kit for retrofitting an existing vehicle trailer, the existing vehicle trailer including a roof and a floor separated from each other by a pair of side walls and a rear wall, the rear wall extending between a top rear edge and a bottom rear edge, the pair of side walls extending along the length of the roof and floor, the roof extending between a top front edge and the top rear edge, the side walls having a height that extends from the floor to the top front edge of the roof, the height being substantially the same along at least a portion of the length of the side walls, the kit comprising:
    a shelf component extending from the rear wall at a location between the top and bottom rear edges such that the shelf component is spaced apart from both the top rear edge and the bottom rear edge, the shelf component extending in a lengthwise direction between a first end and a second end, the shelf component terminating at the first and second ends, the shelf component including a top side and a bottom side opposite the top side and defining a height between the top and bottom sides, the top and bottom sides. extending between a leading edge positioned directly adjacent to the rear wall and a trailing edge spaced apart from the rear wall, at least a portion of the top side defining a sloped surface extending between the leading and trailing edges such that the height varies along at least a portion of the shelf component extending between the leading and trailing edges.

10. The kit of claim 9, wherein the sloped surface is angled downwardly at an angle from about 10 degrees to about 20 degrees, 11. The kit of claim 9, wherein the shelf component is configured to movably articulate between a range of different angles.

12. The kit of claim 9, wherein the sloped surface extends substantially entirely between the leading and trailing edges along the top side.

13. The kit of claim 9, wherein the top side defines a flat surface extending outwardly from the rear wall substantially parallel to the roof, the sloped surface extending from the flat surface to the trailing edge.

14. The kit of claim 13, wherein a ratio of a length of the flat surface to a length of the sloped surface is substantially 1:1.

15. The kit of claim 9, wherein the top side is joined to the bottom side by one or more linking components such that one or more hollow spaced are defined within the shelf component between the top and bottom sides.

16. A method of retrofitting a vehicle trailer, the vehicle trailer comprising a roof and a floor separated from each other by a pair of side walls and a rear wall, the rear wall extending between a top rear edge and a bottom rear edge, the pair of side walls extending along the length of the roof and floor, the roof extending between a top front edge and the top rear edge, the side walls having a height that extends from the floor to the top front edge of the roof, the height being substantially the same along at least a portion of the length of the side walls, the method comprising:
    installing a shelf component on the rear wall of the trailer at a location between the top and bottom rear edges such that the shelf component is spaced apart from both the top rear edge and the bottom rear edge, the shelf component extending in a lengthwise direction between a first end and a second end, the shelf component terminating at the first and second ends, the shelf component including a top side and a bottom side opposite the top side and defining a height between the top and bottom sides, the top and bottom sides extending between a leading edge positioned directly adjacent to the rear wall and a trailing edge spaced apart from the rear wall, at least a portion of the top side defining a sloped surface extending between the leading and trailing edges such that the height varies along at least a portion of the shelf component extending between the leading and trailing edges.

17. The vehicle trailer of claim 8, wherein the shelf component is positioned on the rear wall below the top rear edge a distance ranging from 1 inch to 25 inches.

18. The vehicle trailer of claim 8, wherein the shelf component is positioned on the rear wall below the top rear edge a distance ranging from 2 inches to 12 inches.

19. The kit of claim 9, wherein the shelf component is positioned on the rear wall below the top rear edge a distance equal to less than about 25 inches.

20. The kit of claim 19, wherein the shelf component is positioned on the rear wall below the top rear edge a distance ranging from 1 inch to 25 inches.

21. The method of claim 16, wherein the top side defines a flat surface extending outwardly from the rear wall substantially parallel to the roof, the sloped surface extending from the flat surface to the trailing edge.

22. The method of claim 16, wherein the shelf component is positioned on the rear wall below the top rear edge a distance equal to less than about 25 inches.

23. The method of claim 22, wherein the shelf component is positioned on the rear wall below the top rear edge a distance ranging from 1 inch to 25 inches.

* * * * *